United States Patent [19]

Kohama et al.

[11] 4,322,799

[45] Mar. 30, 1982

[54] EXHAUST GAS RECIRCULATION VALVE CONTROL SYSTEM AND METHOD

[75] Inventors: Tokio Kohama, Nishio; Takeshi Matsui, Aichi; Hisasi Kawai, Toyohashi; Akira Nishimatsu, Aichi; Toshikazu Ina, Okazaki; Hidetaka Nohira; Kiyoshi Kobashi, both of Mishima, all of Japan

[73] Assignees: Nippon Soken, Inc., Nishio; Toyota Jidosha Kogyo Kabushiki Kaisha, Toyota, both of Japan

[21] Appl. No.: 42,344

[22] Filed: May 25, 1979

[30] Foreign Application Priority Data

Jun. 16, 1978 [JP] Japan .................................. 53-73447

[51] Int. Cl.³ ...................... F02M 25/06; G05B 15/02
[52] U.S. Cl. ................................ 364/431.06; 123/568; 123/571
[58] Field of Search ...................... 364/424, 431, 442; 123/480, 486, 489, 568, 571

[56] References Cited

U.S. PATENT DOCUMENTS

| | | | |
|---|---|---|---|
| 3,969,614 | 7/1976 | Moyer et al. | 364/431 |
| 4,161,929 | 7/1979 | Nohira et al. | 123/119 A |
| 4,163,282 | 7/1979 | Yamada et al. | 364/431 |
| 4,164,032 | 8/1979 | Nohira et al. | 364/431 |
| 4,164,206 | 8/1979 | Toelle | 123/119 A |
| 4,173,205 | 11/1979 | Toelle | 123/119 A |
| 4,177,777 | 12/1979 | Maruyama et al. | 123/571 |
| 4,181,944 | 1/1980 | Yamauchi et al. | 364/431 |
| 4,210,112 | 7/1980 | Nakamura et al. | 123/571 |
| 4,226,222 | 10/1980 | Kohama et al. | 123/568 |

OTHER PUBLICATIONS

Morris et al.: Scamp Microprocessor aims to replace Mechanical Logic, Electronics Sep. 18, 1975 pp. 81-87.

*Primary Examiner*—Felix D. Gruber
*Attorney, Agent, or Firm*—Cushman, Darby & Cushman

[57] ABSTRACT

An exhaust gas recirculation system comprises a speed detector for generating an engine rotational speed signal and a reference rotational position detection signal, a pressure sensor for detecting the negative pressure in the intake pipe of an engine to generate a negative pressure signal, a microcomputer responsive to the negative pressure signal and the rotational speed signal generated at the reference rotational position of the engine to compute an amount of exhaust gas recirculation in synchronism with the reference rotational position detection signal, and an electronic control circuit for controlling the opening of an exhaust gas recirculation control valve in accordance with the computed amount.

14 Claims, 10 Drawing Figures

EXHAUST GAS RECIRCULATION VALVE CONTROL SYSTEM AND METHOD

BACKGROUND OF THE INVENTION

The present invention relates to exhaust gas recirculation systems for controlling the amount of exhaust gas recirculation in an engine.

Systems have recently been proposed which are designed to electrically compute and control the amount of exhaust gas recirculation (EGR). For example, the inventor, etc., have proposed a system in which the desired amount (ratio) of EGR is computed by an electronic control circuit such as a microcomputer, which receives an engine intake vacuum signal and engine rotational speed signal as its main input signals. However, the system has been found disadvantageous in that the opening and closing of the intake and exhaust valves of an engine result in intake air pulsations causing intake vacuum pulsations and moreover electric noise is caused by a sparking high voltage supplied to the spark plugs, thus causing the output of the electronic control circuit or the data indicative of the EGR quantity (i.e., the EGR ratio) to vary in response to the pulsations or the electric noise and thereby causing such engine troubles as unstable engine rotation or the like.

SUMMARY OF THE INVENTION

With a view to overcoming the foregoing deficiencies in the prior art, it is the object of the invention to provide an exhaust gas recirculation system which, noting the fact that intake air pulsations and electric noise occur at the corresponding engine crank angles, detects the engine intake vacuum in synchronism with the rotation of the engine, that is, the intake vacuum is detected each time a predetermined engine crank angle (a position at which the engine piston reaches about 120 degrees before the top dead center) is reached, thus making it possible to control the amount of EGR without any variation due to the effect of intake air pulsations as well as electric noise.

The present invention will be described by way of example with reference to the accompanying drawings.

DESCRIPTION OF THE PREFERRED EMBODIMENTS

Figure 1:
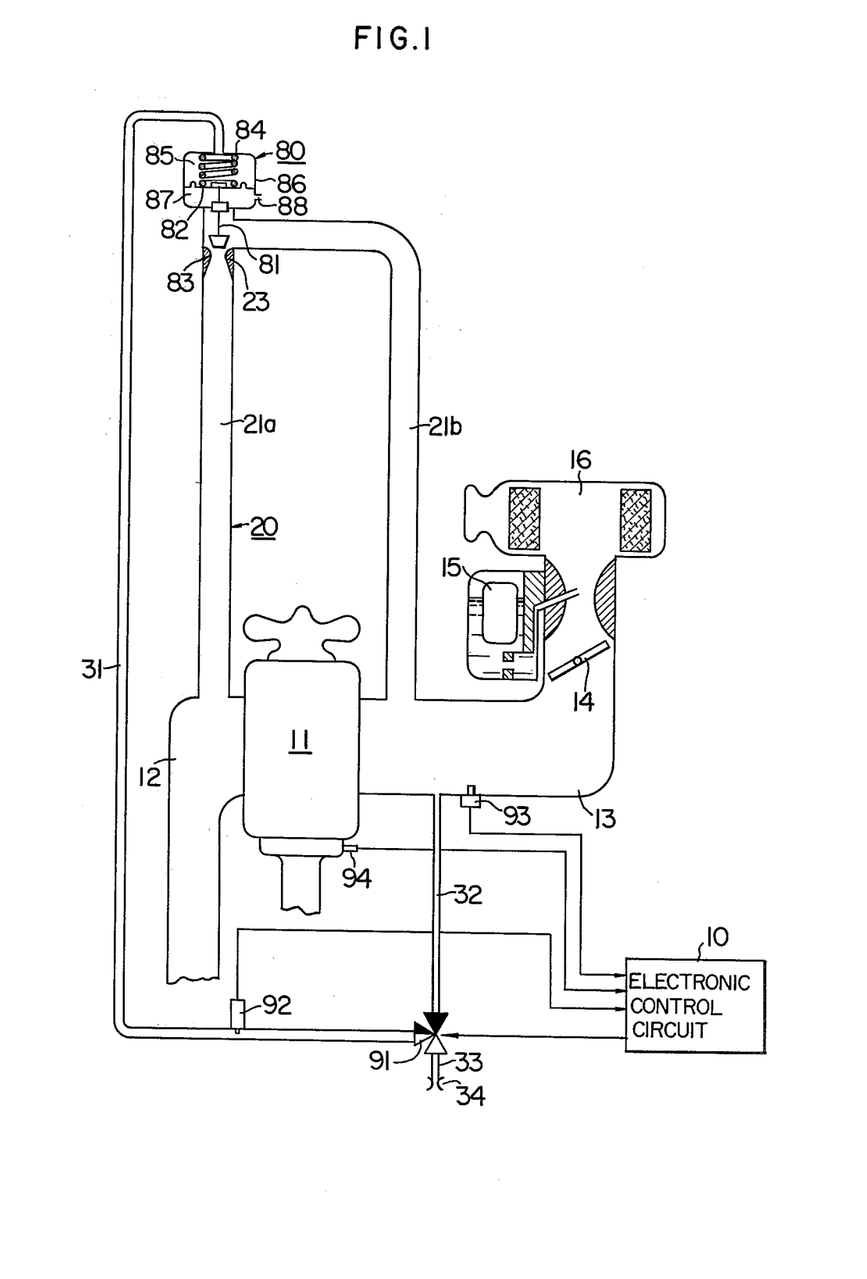
FIG. 1 is a schematic diagram showing the overall construction of a first embodiment of the invention.

Referring to FIG. 1 showing a first embodiment of the invention, an internal combustion engine 11 is a four-cylinder, four-cycle engine and it includes an exhaust pipe 12 and an intake pipe 13. A throttle valve 14 is disposed upstream of the intake pipe 13, and disposed upstream of the throttle valve 14 is a carburetor 15 for mixing gasoline with the air from an air cleaner 16.

An exhaust gas recirculation (EGR) unit 20 comprises recirculation (EGR) pipes 21a and 21b forming recirculation passages and an exhaust gas recirculation (EGR) control valve 80. The EGR pipe 21a has its one end connected to the exhaust pipe 12 and its other end connected to the inlet of the EGR control valve 80 and the other EGR pipe 21b has its one end connected to the outlet of the EGR control valve 80 and its other end connected to the intake pipe 13 downstream of the throttle valve 14. A valve seat 23 is provided at the joint of the EGR pipe 21a and the inlet of the EGR control valve 80, and a variable orifice is provided by a valve member 83 of the EGR control valve 80 and the valve seat 23. The control valve 80 includes diaphragm chambers 85 and 87 which are defined by a housing 86 and a diaphragm 82 mounted inside the housing 86. The first diaphragm chamber 85 defined by the housing 86 and the upper surface of the diaphragm 82, receives the pressure signal controlled by an electronic control circuit 10 through a first pressure inlet pipe 31 having its one end connected to a three-way selector valve 91. The three-way selector valve 91 has its one end connected to the intake pipe 13 through a second pressure inlet pipe 32 and its other end connected to the atmosphere through a third pressure inlet pipe 33. An orifice 34 is formed in the third pressure inlet pipe 33. The atmospheric air is introduced from an atmospheric air inlet 88 into the second diaphragm chamber 87 which is defined by the housing 86 of the EGR control valve 80 and the lower surface of the diaphragm 82. The valve member 83 is connected to the diaphragm 82 by a shaft 81. A spring 84 is mounted in the first diaphragm chamber 85, and the spring 84 acts to urge the valve member 83 toward the valve seat 23.

Numeral 92 designates a pressure sensor for measuring the magnitude of the negative pressure in the first diaphragm chamber 85 for providing an indication of the opening rate of the EGR control valve 80, and in this invention the pressure sensor 92 comprises a semiconductor type pressure sensor.

Numeral 93 designates a semiconductor pressure sensor for measuring the magnitude of the negative pressure in the intake pipe 13.

Numeral 94 designates a reference position detector comprising an electromagnetic pickup for generating a reference pulse for every revolution of the crankshaft of the engine 11 by detecting the position of an iron piece mounted at a point of a ring gear on the crankshaft which corresponds to a reference rotational position (240 degrees). Each reference pulse is generated at the crankshaft rotational position of 240° or at the time that the piston of the engine 11 reaches an angle of 120° before its top dead center. At this rotational position of the crankshaft the intake and exhaust valves of the engine are stably open and closed and there is no pulsation in the negative pressure within the intake pipe. Generally, this rotational position is before the occurrence of a sparking high voltage.

Figure 2:
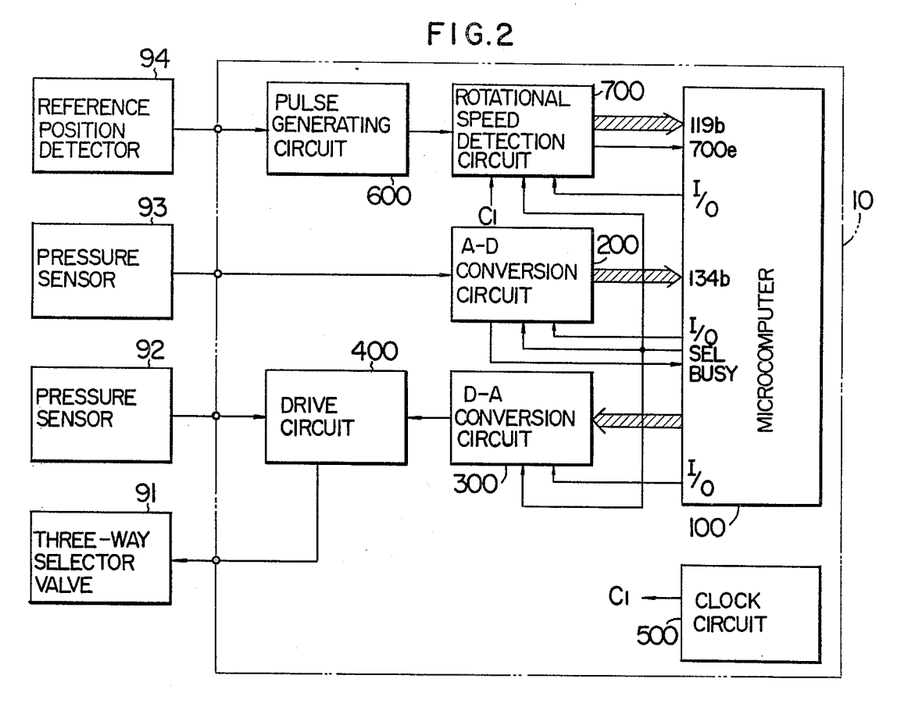
FIG. 2 is a block diagram of the electronic control circuit shown in FIG. 1.

Referring now to FIG. 2, the electronic control circuit 10 will be described. A timing pulse generating circuit 600 is responsive to the output reference pulse signal of the reference position detector 94 to generate a timing pulse signal, and the output signal of the pulse generating circuit 600 consists of a pulsating signal having a period corresponding to the engine rotational speed. This pulse signal is applied to an engine rotational speed detection circuit 700. The engine rotational speed detection circuit 700 detects the period of the timing pulse from the timing pulse generating circuit 600 as a reciprocal of the engine rotational speed, and the detected signal is then converted into a binary code and applied to a microcomputer 100. The rotational speed detection circuit 700 is operated by clock pulse signals $C_1$ of a fixed frequency which are applied from a clock circuit 500 comprising a known type of crystal oscillator circuit.

An A-D conversion circuit 200 converts an analog signal to a digital, that is, the analog intake vacuum signal generated from the pressure sensor 93 is converted to a digital signal or data which in turn is read into the microcomputer 100. This reading operation takes place in synchronism with the reference pulse from the reference position detector 94 or in synchronism with the rotation of the engine as will be described later in detail.

The microcomputer 100 performs the desired computation in response to the engine rotational speed and the intake vacuum, and a control pressure value corresponding to the required exhaust gas recirculation ratio (EGR ratio) is generated in the form of a binary code. The microcomputer 100 may for example be the TOSHIBA TLOS-12A. Its detailed construction and operation are well known and will not be described.

The microcomputer 100 incorporates a read-only memory (ROM) and the ROM contains a preliminarily stored data comprised of the control pressure values for the first diaphragm chamber 85 of the EGR control valve 80 to ensure that the proper amount of exhaust gas is recirculated in accordance with the engine rotational speed and the intake pressure.

A D-A conversion circuit 300 converts a digital signal to an analog signal, that is, the control pressure value generated in binary code form from the microcomputer 100 is converted to an analog voltage and the signal is applied to a drive circuit 400.

The drive circuit 400 is responsive to the analog voltage from the D-A conversion circuit 300 corresponding to the control pressure value and the pressure signal from the pressure sensor 92 (i.e., indicative of the opening ratio signal of the EGR control valve 80) to control the energization of the three-way selector valve 91 in such a manner that the pressure in the first diaphragm chamber 85 of the EGR control valve 80 is controlled to attain the control pressure value and the optimum amount of exhaust gas is recirculated.

Figure 3:
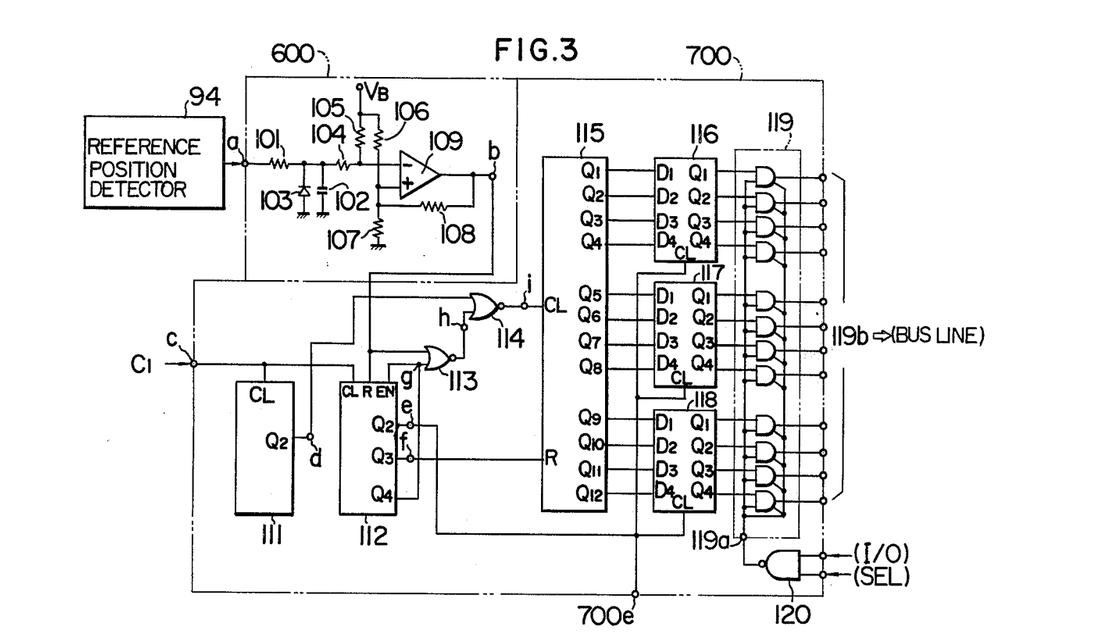
FIG. 3 is a circuit diagram showing the pulse generating circuit and the rotational speed detecting circuit shown in FIG. 2.

Next, the circuit construction of the individual blocks of the electronic control circuit 10 will be described. FIG. 3 shows the timing pulse generating circuit 600 and the rotational speed detection circuit 700. In the Figure, the pulse generating circuit 600 comprises a low-pass filter comprising a resistor 101, a capacitor 102 and a voltage clamping Zener diode 103 and a comparison circuit comprising resistors 104, 105, 106, 107 and 108 and a comparator 109. A bias DC voltage $V_B$ is applied through the resistor 105 to the inverting input terminal (−) of the comparator 109 and a bias voltage having practically the same voltage as that applied to the inverting input terminal is applied to the other noninverting input terminal (+) through the voltage dividing resistors 106 and 107. The comparator 109 is designed so that its output signal rises and falls sharply by virtue of the positive feedback resistor 108.

Figure 6:
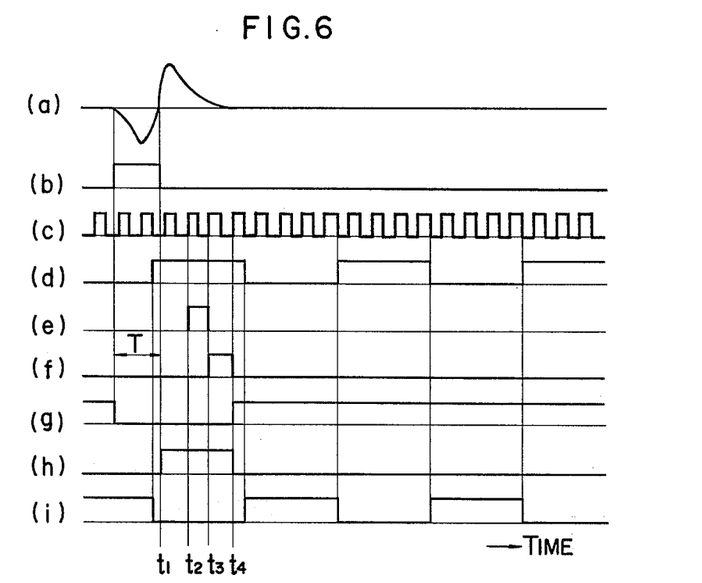
FIGS. 6 to 8 are graphs useful in explaining the operation of the first embodiment.

When the reference position detector 94 comprising an electromagnetic pickup generates at a predetermined crank angle a pulsating signal as shown in (a) of FIG. 6 for every revolution of the crankshaft of the engine 11, the comparator 109 generates a timing pulse signal having a waveform such as shown in (b) of FIG. 6.

Next, the rotational speed detection circuit 700 will be described. A binary counter 111 counts and divides the clock pulse signals $C_1$ which are applied to its clock terminal CL, and it may for example be the RCA CD4024. The clock pulses $C_1$ generated at about 128 KHz as shown in (c) of FIG. 6, are divided in frequency by the counter 111 and the resulting divided in frequency pulse signals of about 32 KHz are generated at its output terminal $Q_2$ as shown in (d) of FIG. 6.

A counter/decoder 112 basically functions to count the clock pulse signals $C_1$ applied to its clock terminal CL, and its counting operation is stopped when the output signal from one of its output terminals $Q_2$ to $Q_4$ goes to a "1" level and a "1" level signal is applied to its counting stop terminal EN.

In the present embodiment the output terminal $Q_4$ is connected to the stop terminal EN, so that when the output at the output terminal $Q_4$ goes to the "1" level, the "1" level signal is applied to the stop terminal EN and the counting operation is stopped. In this condition, when the timing pulse signal shown in (b) of FIG. 6 is applied from the pulse generating circuit 600 to the reset terminal of the counter 112, the counter 112 is reset and the output at the output terminal $Q_4$ goes to a "0" level as shown in (g) of FIG. 6. When a time interval T elapses so that the signal applied to the reset terminal R goes to the "0" level, the counter 112 starts its counting operation and pulse signals are sequentially generated from the output terminals $Q_2$ and $Q_3$ as shown in (e) and (f) of FIG. 6. Thereafter, when the output at the output terminal $Q_4$ goes to the "1" level, the counter 112 again stops its counting operation.

The output signals of the counters 111 and 112 and the pulse generating circuit 600 are respectively applied through NOR gates 113 and 114 to the clock terminal CL of a 12-bit counter 115 and the $Q_3$ output of the counter 112 is applied to the reset terminal R of the counter 115.

In other words, the NOR gate 113 performs the NOR operation on the output signal of the pulse generating circuit 600 shown in (b) of FIG. 6 and the $Q_4$ output of the counter 112 shown in (g) of FIG. 6 thus generating a pulse signal shown in (h) of FIG. 6, and the NOR gate 114 performs the NOR operation on the output signal of the NOR gate 113 and the output signal of the counter 111 shown in (d) of FIG. 6, so that the NOR gate 114 generates a pulse signal as shown in (i) of FIG. 6 and the pulse signal is applied to the counter 115.

The counter 115 stops its counting operation when the timing pulse signal shown in (b) of FIG. 6 goes to the "0" level at a time $t_1$ and consequently the output of the NOR gate 113 shown in (h) of FIG. 6 goes to the "1" level. Thereafter, in response to the positive-going transition of the $Q_2$ output of the counter 112 at a time $t_2$ the outputs from the output terminals $Q_1$ to $Q_{12}$ of the counter 115 are temporarily held and stored by shift registers 116 to 118 (e.g., the RCA CD4035). Then, when the $Q_3$ output of the counter 112 goes to the "1" level at a time $t_3$, the counter 115 is reset. When the $Q_4$ output of the counter 112 goes to the "1" level at a time $t_4$, the counter 115 again starts its counting operation.

This operation of the counter 115 is performed repeatedly in synchronism with a timing pulse signal which is generated each time the reference position detector 94 detects the reference rotational position of the crankshaft, and consequently a binary signal proportional to the reciprocal 1/N of the engine rotational speed N is generated from the output terminals $Q_1$ to $Q_4$ of the shift registers 116 to 118.

A three-state buffer 119 is designed so that its output presents a high impedance as long as a "1" level signal is applied to its control terminal 119a and its output terminal group 119b is connected to the microcomputer 100 by way of a bus line.

A NAND gate 120 applies its output signal to the control terminal 119a, and the NAND gate 120 receives an input/output control signal (hereinafter referred to as an I/O signal) and a device select signal (hereinafter referred to as an SEL signal) from the device control unit (DCU) incorporated in the microcomputer 100. Then, when the output signal of the NAND gate 120 goes to the "0" level, the binary signal generated from the shift registers 116 to 118 and proportional to the reciprocal 1/N is applied to the microcomputer 100.

On the other hand, the rotational speed detection circuit 700 applies the pulse signal shown in (e) of FIG. 6 to the microcomputer 100 through its terminal 700e and this signal serves as an interruption request signal.

Figure 4:
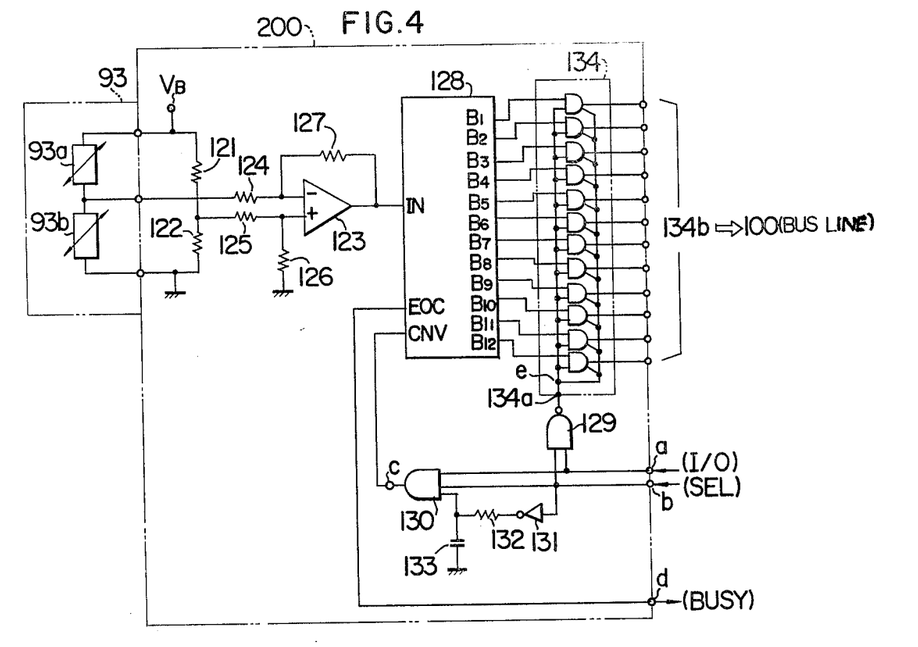
FIG. 4 is a circuit diagram of the A-D conversion circuit shown in FIG. 2.

Next, the A-D conversion circuit 200 will be described with reference to FIG. 4. A bridge is formed with resistors 121 and 122 and resistive elements 93a and 93b of the pressure sensor 93 which detects the intake vacuum. The DC bias voltage $V_B$ is applied to the resistor 121 and the resistive element 93a, and the resistor 122 and the resistive element 93b have their one-side ends connected to the ground. The resistance values of the resistive elements 93a and 93b in the pressure sensor 93 vary in a complementary manner in response to the magnitude of the intake vacuum.

The junction of the resistive elements 93a and 93b and the junction of the resistors 121 and 122 are respectively connected through input resistors 124 and 125 to an OP (operational) amplifier 123. A grounding resistor 126 and a negative feedback resistor 127 are connected to the OP amplifier 123, and the OP amplifier 123 serves as a differential amplifier. Thus, the OP amplifier 123 generates an output voltage corresponding to the negative pressure in the intake pipe 113.

The output voltage of the OP amplifier 123 is applied to a sequential comparison type A-D converter 128 (such as the Barbrown ADC80A-12).

Figure 7:
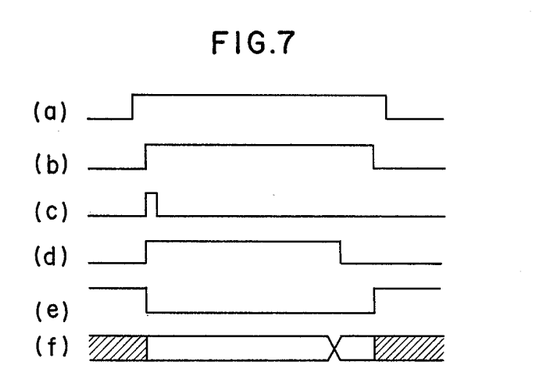

A NAND gate 129 and an AND gate 130 are each adapted to receive the I/O signal shown in (a) of FIG. 7 and the SEL signal shown in (b) of FIG. 7 from the device control unit DUC in the microcomputer 100. When, in response to the pulse signal generated from the rotational speed detection circuit 700 as shown in (e) of FIG. 6, the microcomputer 100 starts its interruption operation to execute a command for reading the A-D converter output into the microcomputer 100 during the interruption operation, the I/O signal and the SEL signal are supplied through an interruption control unit and thus the signals are generated in synchronism with a predetermined rotational angle of the engine.

A delay circuit is constituted by an inverter 131, a resistor 132 and a capacitor 133, and the SEL signal is applied to the AND gate 130 by way of the delay circuit.

The AND gate 130 generates a pulse signal having a time width of about 100 nanoseconds as shown in (c) of FIG. 7. This pulse signal is applied to the A-D conversion command terminal CNV of the sequential comparison type A-D converter 128.

The sequential comparison type A-D converter 128 is designed so that its conversion operation is initiated in response to the positive-going transition of the pulse signal which is applied to the A-D conversion command terminal CNV and simultaneously the output signal at the end of conversion terminal EOC goes to the "1" level. The end of conversion terminal EOC is connected to the busy terminal BUSY of the device control unit DCU in the microcomputer 100, and an intake pressure read command is not completed until the output signal at the end of conversion terminal EOC goes to the "0" level up to which time the I/O signal and the SEL signal are both held at the "1" level. The sequential comparison type A-D converter 128 performs its conversion operation during the "1" level period of the output signal at the terminal EOC, and a digitized binary data signal is generated from its output terminals $B_1$ to $B_{12}$.

A three-state buffer 134 is of the same type as used in the rotational speed detection circuit 700, so that when a "0" level signal is applied to its control terminal 134a as shown in (e) of FIG. 7, the binary data signal is applied from its output terminal group 134b to the microcomputer 100 through a bus line during the unhatched time interval in (f) of FIG. 7.

When the A-D conversion operation of the A-D converter 128 is terminated, the value appearing on the bus line to the microcomputer 100 is stabilized and simultaneously the output signal from the end of conversion terminal EOC shown in (d) of FIG. 7 goes to the "0" level. As a result, the wait condition of the read command for the microcomputer 100 is released and the intake vacuum data on the bus line is read into the microcomputer 100. Thereafter, the microcomputer 100 changes the I/O signal and the SEL signal to "0" and the output of the three-state buffer 134 goes to a high impedance state, thus completing the intake vacuum data read command operation.

The microcomputer 100 will now be described. The microcomputer 100 is responsive to a data signal indicative of an intake vacuum $P_B$ and a data signal proportional to the reciprocal 1/N to compute the proper control value $P_D$ for the pressure in the first diaphragm chamber 85 of the EGR control value 80. The microcomputer 100 performs a reciprocal operation on the data signal proportional to the reciprocal 1/N, and obtains the proper control value $P_D$ by a calculating operation performed with the value thereby obtained and the data signal indicative of intake vacuum $P_B$. Specifically, the values of engine rotational speed N ranging from 1000 to 2800 rpm are divided into 10 steps of 200 rpm in correspondence with 10 addresses to obtain a signal N(RPM), and consequently the speed of 1000 rpm corresponds to the address "0". The values of intake vacuum $P_B$ ranging from $-60$ to $-510$ mmHg are divided into 19 steps of 25 mmHg in correspondence with 19 addresses and consequently the intake vacuum $-60$ mmHg corresponds to the address "0". The required EGR ratios are obtained experimentally in correspondence with the values of engine rotational speed N and negative pressure $P_B$. Also obtained by experiments are the control values $P_D$ of the pressure in the first diaphragm chamber 85 of the EGR control valve 80 and the values satisfy the required EGR ratios. Consequently, a control value $P_D$ is determined linearly in dependence on the value of rotational speed N and intake vacuum $P_B$, respectively. The thus obtained control values $P_D$ are preliminarily programmed into the ROM of the microcomputer 100 in correspondence with the addresses of rotational speed N and intake vacuum $P_B$. In this way, one of the control values $P_D$ is read out as an output N of the ROM in response to the values of rotational speed N and intake vacuum $P_B$. However, since 10 addresses for the values of rotational speed N and 19 addresses for the values of intake vacuum $P_B$ can be stored, the corresponding value $P_D$ to any intermediary value of the stored values is obtained by the process of interpolation with 32 divisions. Assume now that there is a function $P_D$ given by $P_D = f(N, P_B)$ with respect to the rotational speed N and the intake vacuum $P_B$ and that the ROM generates a value of $P_D(h, k) = f(Nh, P_Bk)$ in response to an engine rotational speed address $h(h=0, 1, ---, 10)$ and an intake vacuum address k. Where the engine rotation speed is $N_x$ which corresponds to between addresses Nh and N(h+1) and the intake vacuum is $P_{By}$ which corresponds to between addresses $P_Bk$ and $P_B(k+1)$, the corresponding value $P_D$ is computed in the following manner. The values of $P_D(h, k) = f(Nh, P_Bk)$ and $P_D(h+1, k) = f(Nh+1, P_Bk)$ are first read from the ROM and then $P_D(x, k) = f(Nx, P_Bk)$ is obtained by the proportional calculation. Next, the values of $P_D(h, k+1) = f(Nh, P_B(k+1))$ and $P_D(h+1, k+1) = f(Nh+1, P_B(k+1))$ are read from the ROM and then $P_D(x, k+1) = f(Nx, P_B(k+1))$ is obtained by the proportional calculation. Thereafter, the values of $P_D(x, k)$ and $P_D(x, k+1)$ are subjected to interpolation calculation with the addresses $P_Bk$, $P_{By}$ and $P_B(k+1)$ to obtain the value of $P_D(x, y) = f(Nx, P_{By})$. This four point interpolation calculation method is well known and will not be described further. When these computational operations are completed by the microcomputer 100, the calculated data or the desired control value $P_D$ for the pressure in the first diaphragm chamber 85 of the EGR control valve 80 is supplied as a data in the form of a parallel binary number to the D-A conversion circuit 300.

Figure 5:
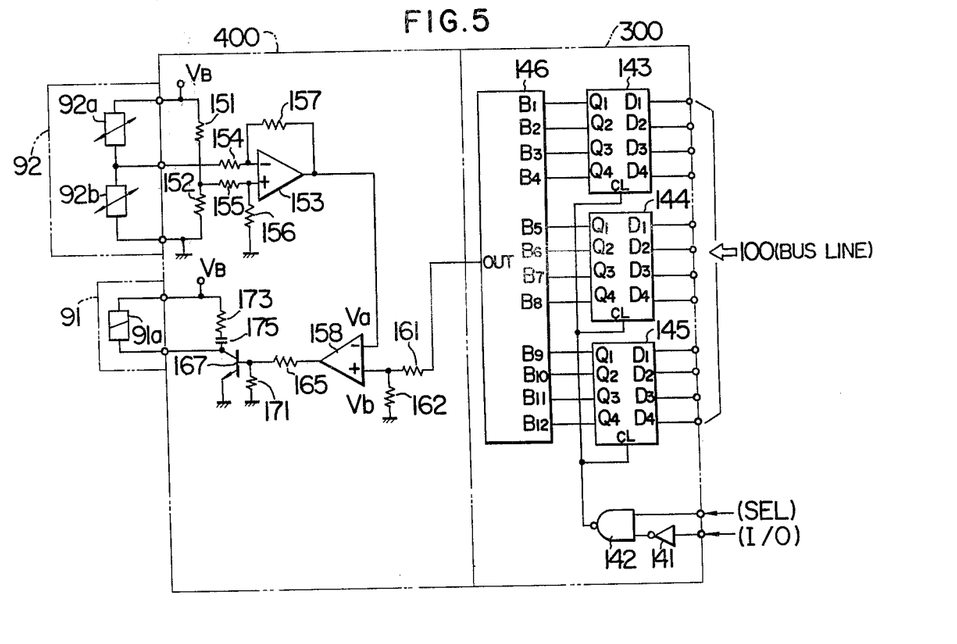
FIG. 5 is a circuit diagram showing the D-A conversion circuit and the drive circuit shown in FIG. 2.

Next, the D-A conversion circuit 300 and the drive circuit 400 will be described with reference to FIG. 5. The D-A conversion circuit 300 comprises an inverter 141, a NAND gate 142, shift registers 143 to 145 and a D-A converter 146 (e.g., the Barbrown DAC80).

The I/O signal from the microcomputer 100 is inverted by the inverter 141 and then applied to the NAND gate 142 and the signal SEL is directly applied to the NAND gate 142.

Consequently, when a command is generated to deliver to the D-A conversion circuit 300 the control pressure value $P_D$ which was computed by the microcomputer 100, the I/O signal goes to the "0" level and the SEL signal goes to the "1" level, thus causing the NAND gate 142 to generate a "0" level signal. This "0" level signal is applied to the clock terminal CL of the shift registers 143 to 145, respectively.

The shift registers 143 to 145 are each of the same type as those used in the rotational speed detection circuit 700, so that when a "0" level signal is applied to the clock terminal CL, the signals applied to its data input terminals $D_1$ to $D_4$ are taken in and the signals are generated from its output terminals $Q_1$ to $Q_4$. In this way the binary data signal indicative of the control pressure value $P_D$ is applied to the input terminals $B_1$ to $B_{12}$ of the D-A converter 146 so that the signal is converted to an analog voltage and then generated from the output terminal OUT. In other words, the analog voltage proportional to the data signal indicative of the control pressure value $P_D$ is generated from the output terminal OUT.

Next, the drive circuit 400 will be described. A bridge is formed by resistors 151 and 152 and two resistive elements 92a and 92b of the pressure sensor 92 adapted to detect the pressure in the first diaphragm chamber 85 of the EGR control valve 80. The DC bias voltage $V_B$ is applied to the resistor 151 and the resistive element 92a, respectively, and one-side ends of the resistor 152 and the resistive element 92b are grounded. The resistance values of the resistive elements 92a and 92b of the pressure sensor 92 vary in a complementary manner in proportion to the pressure value in the like manner as the pressure sensor 93.

The junction of the resistive elements 92a and 92b and the junction of the resistors 151 and 152 are respectively connected through input resistors 154 and 155 to an OP amplifier 153. A grounding resistor 156 and a negative feedback resistor 157 are also connected to the OP amplifier 153 and the OP amplifier 153 generates an output voltage which is proportional to the magnitude of the negative pressure in the first diaphragm chamber 85 of the EGR control valve 80. A comparator 158 compares the output voltage of the D-A conversion circuit 300 with the output voltage of the OP amplifier 153, and the output voltage of the D-A conversion circuit 300 is divided by an input resistor 161 and a grounding resistor 162 and then applied to the comparator 158.

The comparator 158 applies its output signal to a power transistor 167 through an input resistor 165 to turn the power transistor 167 on and off. An electromagnetic coil 91a of the three-way selector valve 91 is connected between the collector of the transistor 167 and the power supply $V_B$ and consequently the three-way selector valve 91 is operated in response to the turning on and off of the transistor 167. Numeral 171 designates a grounding resistor, 173 a collector resistor, and 175 a shock voltage absorbing capacitor.

The drive circuit 400 operates as follows. When a voltage Va corresponding to the negative pressure in the first diaphragm chamber 85 of the EGR control valve 80 becomes lower than a voltage Vb corresponding to the control data $P_D$ computed by the microcomputer 100, the output of the comparator 158 goes to the "1" level and is applied through the resistor 165 to the base of the transistor 167 thus turning it on. When this occurs, a current flows to the electromagnetic coil 91a of the three-way selector valve 91 which is connected to the collector of the transistor 167 and the three-way selector valve 91 operates in such a manner that the pressure inlet pipe 32 connected to the intake pipe 13 is communicated with the pressure inlet pipe 31 leading to the first diaphragm chamber 85 of the EGR control valve 80. Consequently, the negative pressure in the first diaphragm chamber 85 is increased to approach the control data $P_D$. When the pressure in the first diaphragm chamber 85 of the EGR control valve 80 becomes greater than the control data $P_D$, the output of the comparator 158 goes to the "0" level, so that the transistor 167 is turned off and the current no longer flows to the electromagnetic coil 91a of the three-way selector valve 91. Consequently, the pressure inlet pipe 31 is disconnected with the pressure inlet pipe 32 and communicated with the pressure inlet pipe 33, so that the pressure inlet pipe 31 or the first diaphragm chamber 85 is opened to the atmosphere through the orifice 34 and the negative pressure in the first diaphragm chamber 85 is decreased to approach the control data $P_D$. As a result, the EGR control valve 80 is controlled so that the pressure in the first diaphragm chamber 85 attains the control value $P_D$ computed by the microcomputer 100, that is, the EGR ratio computed by the microcomputer 100 is ensured.

Figure 8:
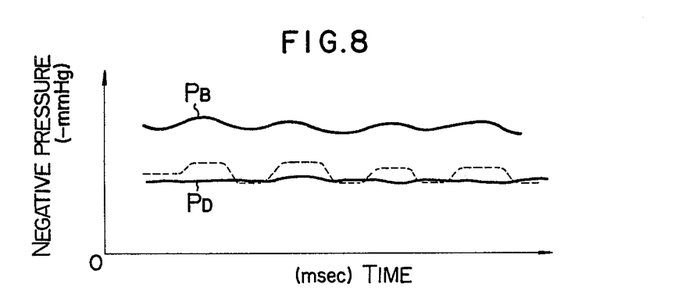

With the embodiment constructed as described above, a binary data signal indicative of the intake vacuum is introduced into the microcomputer 100 from the A-D conversion circuit 200 in synchronism with a reference pulse from the reference position detector 94 (i.e., the pulse signal generated from the terminal 700e of the rotational speed detection circuit 700 and shown in (e) of FIG. 6), and consequently the intake vacuum is sampled at a predetermined crank position of the engine. Since the intake vacuum ($P_B$) pulsates due to intake air pulsations caused by the explosion, exhaust, intake and compression strokes, respectively, if the intake vacuum is sampled at a fixed period irrespective of the predetermined crank position of the engine, the corresponding control data indicative of the EGR ratio computed by the microcomputer 100 (the control value $P_D$ which determines the magnitude of the negative pressure in the first diaphragm chamber 85 of the EGR control valve 80) would also vary (pulsate) greatly as shown by the dotted line in FIG. 8. This gives rise to a great disadvantage that the ratio of EGR or the amount of EGR is varied, thus causing engine troubles. Variation of the control data $P_D$ is attributable to the fact that the control data $P_D$ indicative of the ratio of EGR and computed by the microcomputer varies greatly with each change in the intake vacuum, and during engine operation, particularly low speed operation, even a slight deviation, such as a pulsation of the intake vacuum, results in a large deviation of the data representing the ratio of EGR. With the above-described embodiment, however, the intake vacuum is sampled at a predetermined crank position of the engine, that is, a data of intake vacuum is introduced into the microcomputer 100 without being affeted by intake air pulsations, and consequently a control data $P_D$ indicative of the ratio of EGR and computed by the microcomputer 100 is practically not subject to variations due to the intake air pulsations.

While, in the first embodiment described hereinabove, the three-way selector valve 91 is used to control the negative pressure in the first diaphragm chamber 85 of the EGR control valve 80, the problem with using the three-way selector valve 91 is that due to the intake vacuum and the atmospheric pressure being alway introduced alternately into the EGR control valve 80, there is no stable position and consequently unless the inner diameter of the orifice 34 is reduced considerably, the negative pressure in the first diaphragm chamber 85 of the EGR control valve 80 will be caused to vary considerably. If the inner diameter of the orifice 34 is reduced, it will result in an increase in the response time or the time required for the pressure in the first diaphragm chamber 85 of the EGR control valve 80 to attain the control value $P_D$ computed by the microcomputer 100 with the resulting deterioration in the response characteristic.

Figure 9:
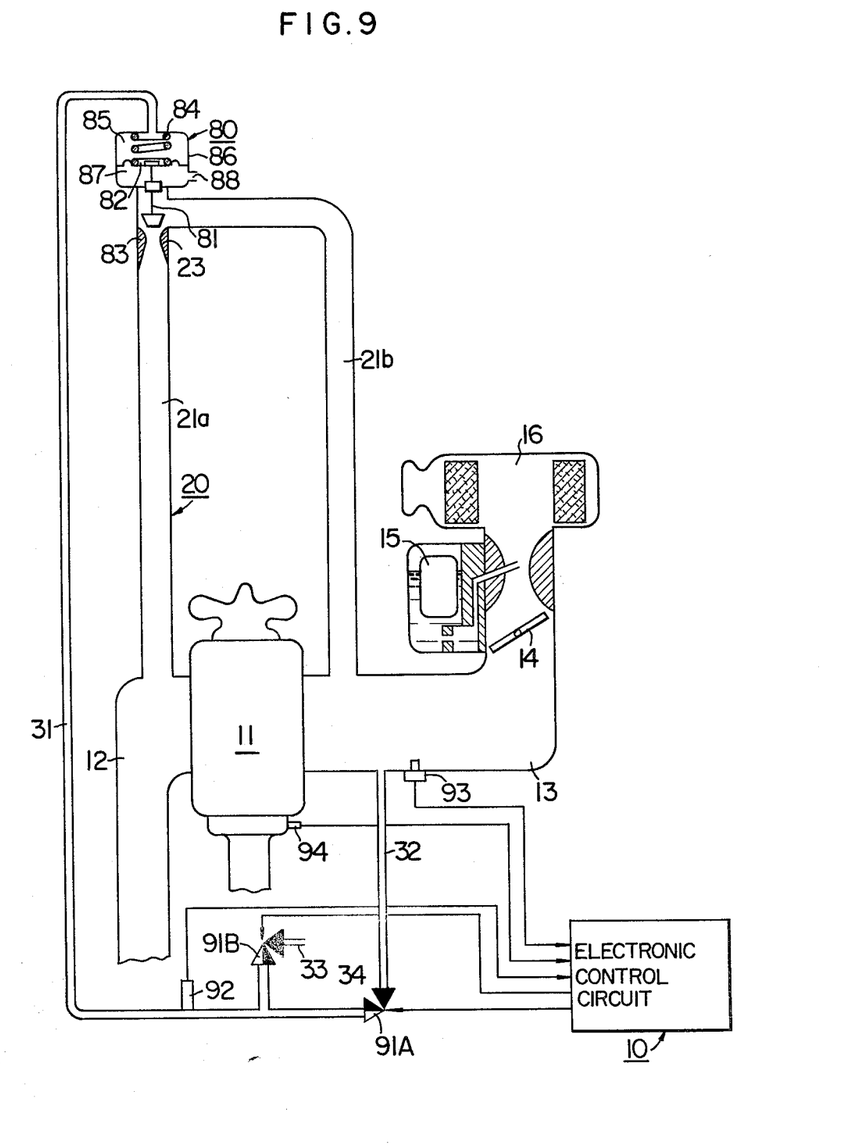
FIG. 9 is a schematic diagram showing the overall construction of a second embodiment of the invention.

In the second embodiment shown in FIG. 9, the three-way selector valve 91 of the first embodiment is replaced with two electromagnetic valves 91A and 91B of the two-way selection type. The electromagnetic valve 91A is connected to the pressure inlet pipe 32 communicating with the intake pipe 13 and the pressure inlet pipe 31 communicating with the EGR control valve 80, and the other electromagnetic valve 91B is connected to the pressure inlet pipe 33 opened to the atmosphere and the pressure inlet pipe 31. The second embodiment is identical with the first embodiment except only the construction of the drive circuit 400 in the electronic control circuit 10 differs somewhat due to the use of the electromagnetic valves 91A and 91B, and the drive circuit 400 will now be described with reference to FIG. 10. Differing from the first embodiment shown in FIG. 5, the drive circuit 400 further comprises some additional components including resistors 163 and 164, a comparator 159, resistors 166 and 172, a transistor 168, a capacitor 176 and a resistor 174. Numerals 911 and 912 designate the electromagnetic coils of the electromagnetic valves 91A and 91B. Assuming that $V_D$ is indicative of the desired ratio of EGR produced by the computation of the microcomputer 100 (i.e., the desired control value $P_D$ to which the negative pressure in the first diaphragm chamber 85 of the EGR control valve 80 is to be controlled) and converted to the corresponding voltage by the D-A conversion in the D-A conversion circuit 300, $V_B$ a fixed voltage supplied from the power source, $R_1$, $R_2$, $R_3$ and $R_4$ the resistance values of the resistors 161, 162, 163 and 164, and $R_1=R_3$ and $R_2=R_4$, then a comparison voltage $V_1$ applied to the noninverting input terminal of the comparator 158 is given by $V_1=V_D\cdot R_2/(R_1+R_2)$ and a comparison voltage $V_2$ applied to the inverting input terminal of the comparator 159 is given by $V_2=V_D\cdot R_4/(R_3+R_4)+V_B\cdot R_3/(R_3+R_4)$. Thus, if $V_B\cdot R_3/(R_3+R_4)=\Delta V$, then we obtain $V_2=V_1+\Delta V$. In other words, an offset voltage corresponding to $\Delta V$ is applied to the comparator 159 in comparison with the comparator 158.

Figure 10:
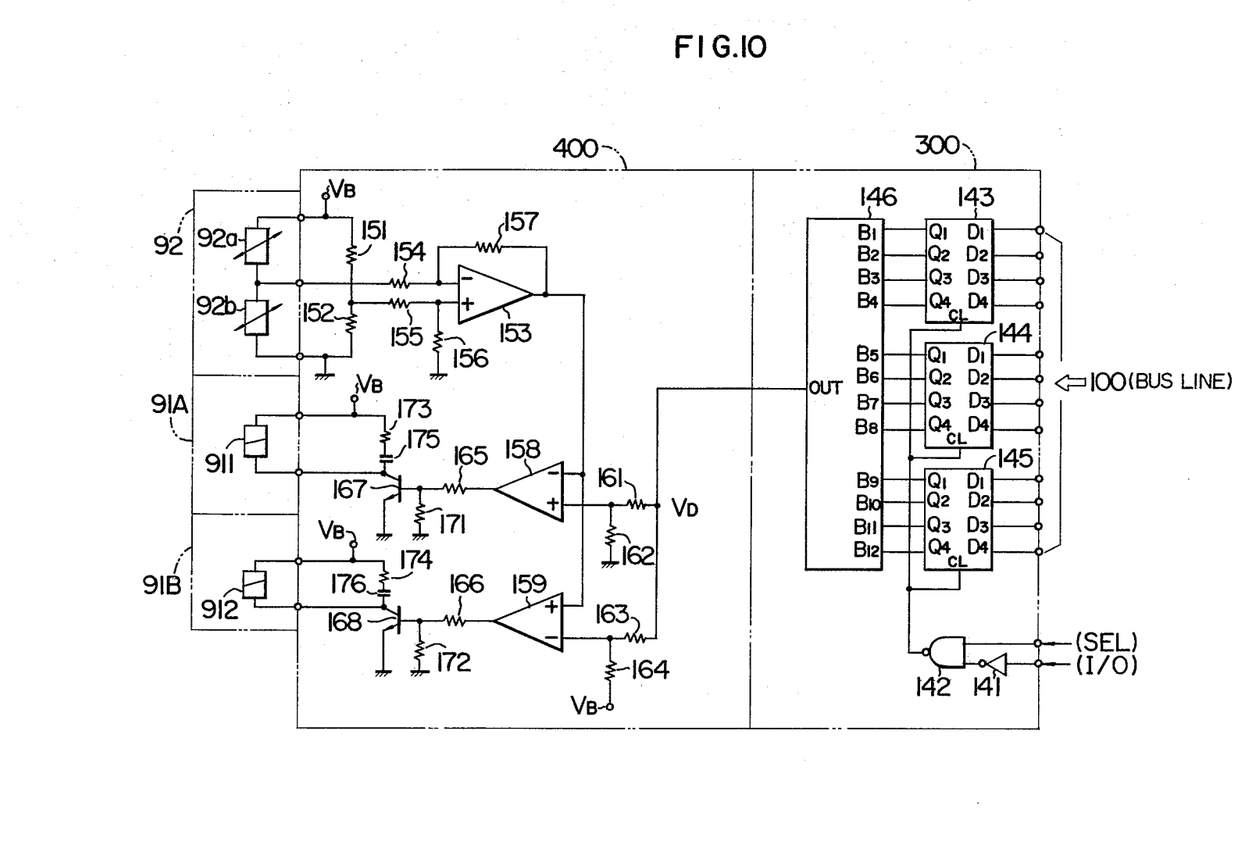
FIG. 10 is a circuit diagram showing the D-A conversion circuit and the drive circuit in the electronic control circuit shown in FIG. 9.

The drive circuit 400 and the electromagnetic valves 91A and 91B operate as follows. When the output voltage of the OP amplifier 153 which is proportional to the negative pressure in the first diaphragm chamber 85 of the EGR control valve 80, is lower than the comparison voltage $V_1$ corresponding to a value which is slightly lower than the control value $P_D$ computed by the microcomputer 100, only the output of the comparator 158 goes to the "1" level so that the transistor 167 is turned on and the electromagnetic coil 911 of the electromagnetic valve 91A is energized, thus introducing the intake vacuum into the first diaphragm chamber 85 of the EGR control valve 80 to increase the negative pressure therein. On the contrary, when the output voltage of the OP amplifier 153 which is proportional to the negative pressure in the diaphragm chamber 85, is higher than the comparison voltage $V_2$ corresponding to a value which is slightly greater than the control value $P_D$, only the output of the comparator 159 goes to the "1" level so that the transistor 168 is turned on and the electromagnetic coil 912 of the electromagnetic valve 91B is energized, thus introducing the atmospheric pressure into the diaphragm chamber 85 of the EGR control valve 80 to decrease the negative pressure therein. When the output voltage of the OP amplifier 153 which is proportional to the negative pressure in the diaphragm chamber 85 is between the comparison voltages $V_1$ and $V_2$, the outputs of the comparators 158 and 159 both go to the "0" level and consequently the electromagnetic valves 91A and 91B are both closed. A range of negative pressures corresponding to the difference between the comparison voltages $V_1$ and $V_2$ or $\Delta V$ is about 10 mmHg around the control value $P_D$.

With the second embodiment described above, there is no possibility of the negative pressure in the diaphragm chamber 85 of the EGR control valve 80 always varying in small amounts as in the case of the first embodiment. Moreover, the response in the operation of the EGR control valve is improved over that of the first embodiment and also the number of times of operation of the electromagnetic valves 91A and 91B is decreased with the resulting improvement in durability.

While, in the embodiments described above, the pressure sensor 92 is used as a means of detecting the pressure in the first diaphragm chamber 85 indicative of the opening ratio of the EGR control valve 80, a displacement detector such as a differential transformer or potentiometer may be mounted on the valve member operating shaft of the EGR control valve 80 to detect the opening ratio of the EGR control valve 80.

Further, while, in the above-described embodiments, a control value $P_D$ is computed by the microcomputer 100 and the computed control value $P_D$ is compared with the actual pressure in the first diaphragm chamber 85 of the EGR control valve 80 by the comparators 158 and 159 of the drive circuit 400 to control the opening of the EGR control valve 80, the function of such comparison operation may be programmed into the microcomputer 100 to eliminate the comparators. In this case, however, it is necessary to use a microcomputer having a faster operation time.

Further, while, in the above-described embodiments, the EGR control valve 80 is of the type which is operated in response to the intake vacuum. In accordance with the same concept as the above-mentioned embodiments, an electromagnetically operated actuator or hydraulically operated actuator may be used for the EGR control valve.

It will thus be seen from the foregoing description that the present invention has a great advantage that with an exhaust gas recirculation system including an electronic control circuit designed to compute the desired amount or ratio of exhaust gas recirculation (EGR) in accordance with the intake vacuum and rotational speed of an engine, an intake vacuum signal is detected at a predetermined rotational position (crank angle) in synchronism with the rotation of the engine, thus preventing a computed control value of EGR quantity from being varied under the influence of intake air pulsations and thereby preventing any engine irregularities.

We claim:

1. An exhaust gas recirculation system comprising:
    position detecting means for generating a reference position signal each time a predetermined rotational position of an engine is reached;
    a first detector for detecting a negative pressure in an intake pipe of said engine to generate an analog negative pressure signal;
    an exhaust gas recirculation control valve for controlling an amount of exhaust gas recirculated from an exhaust pipe of said engine to said intake pipe;
    a second detector for detecting an opening ratio of said control valve to generate a valve opening ratio signal;
    a rotational speed detection circuit responsive to said reference position signal to generate a digital engine rotational speed signal;
    an analog to digital converter circuit for converting said negative pressure analog signal into a negative pressure digital signal in response to said reference position signal;
    computing means for computing and generating an exhaust gas recirculation control signal in response to said negative pressure digital signal and said engine rotational speed digital signal; and
    a drive circuit responsive to said valve opening ratio signal and said exhaust gas recirculation control signal to drive said recirculation control valve.

2. An exhaust gas recirculation system comprising:
    position detecting means for generating a reference signal each time a predetermined rotational position of an engine is reached;
    means for detecting a negative pressure in an intake pipe of said engine to generate a first negative pressure signal;
    exhaust gas recirculation means including an exhaust pipe of said engine, an intake pipe and exhaust gas recirculation control valve means, for controlling an amount of exhaust gas recirculated from said exhaust pipe to said intake pipe;
    means for detecting a negative pressure in said recirculation means to generate a second negative pressure signal;
    means responsive to said reference signal to generate a timing pulse signal;
    means for converting said timing pulse signal to a binary coded speed signal and for obtaining an interruption start signal in substantial synchronism with said reference signal;
    means for converting said first negative pressure signal to a binary coded negative pressure signal;
    microcomputer means responsive to said interruption start signal for enabling the converting operation of said negative pressure converting means in substantial synchronism with said reference signal for generating a binary coded optimum quantity recirculation instruction signal from said binary coded speed signal and said binary coded negative pressure signal in substantial synchronism with said reference signal;
    means for converting said instruction signal to an analog signal; and
    means responsive to said analog signal and said second negative pressure signal for driving said control valve means to optimize said amount of exhaust gas recirculated.

3. A system according to claim 1 or 2, wherein said position detecting means generates said reference position signal each time a selected piston of said engine reaches about 120 degrees before top dead center.

4. A system according to claim 2 wherein said timing pulse converting and interruption start signal obtaining means comprises means for generating clock pulses and counter means for counting said clock pulses to generate said interruption start signal in substantial synchronism with said reference signal, and wherein said first negative pressure signal converting means comprises an A-D converter which is enabled by said interruption start signal applied thereto through a delay circuit, and further comprising a three-state buffer connected between said A-D converter and said microcomputer means so as to be controlled in response to said interruption start signal.

5. A system according to claim 2 or 4, wherein a plurality of binary coded recirculation instruction signals are programmed into said microcomputer means, each of said recirculation instruction signals being predetermined corresponding to one of a plurality of selected engine rotational speeds and one of a plurality of selected negative pressures in said intake pipe, wherein a binary coded recirculation instruction signal corresponding to a nonselected intermediary engine rotational speed and non-selected negative pressure in said intake pipe is generated by an interpolation calculation.

6. A system according to claim 2, wherein said control valve means includes a three-way selector valve communicated with said intake pipe and the atmosphere and disposed to be driven by said driving means.

7. A system according to claim 2, wherein said control valve means includes a first electromagnetic valve communicated with said intake pipe and a second electromagnetic valve communicated with the atmosphere, and wherein said drive means includes a first comparator having an inverting input terminal for receiving said second negative pressure signal and a noninverting input terminal for receiving said analog signal divided by a predetermined voltage dividing ratio to thereby control said first electromagnetic valve, and a second comparator having a noninverting input terminal for receiving said second negative pressure signal and an inverting input terminal for receiving said analog voltage increased by a predetermined rate to thereby control said second electromagnetic valve.

8. A system according to claim 1, wherein said control valve includes a first electromagnetic valve communicated with said intake pipe and a second electromagnetic valve communicated with the atmosphere, and wherein said drive circuit includes a first comparator having an inverting input terminal for receiving said valve opening ratio signal and a non-inverting input terminal for receiving said exhaust gas recirculation control signal divided by a predetermined voltage dividing ratio to thereby control said first electromagnetic valve, and a second comparator having a noninverting input terminal for receiving said valve opening ratio signal and an inverting input terminal for receiving said exhaust gas recirculation control signal increased by a predetermined rate to thereby control said second electromagnetic valve.

9. A system according to claim 1 or 2, wherein said position detecting means generates said reference position signal each time a crankshaft of said engine occupies a crankshaft rotational position of 240 degrees.

10. An exhaust gas recirculation system for an internal combustion engine having an intake manifold thereto and an exhaust manifold therefrom, comprising:
valve means connected between said exhaust manifold and said intake manifold for controllably recirculating engine exhaust gas from said exhaust manifold to said intake manifold;
pressure determining means for determining a level of negative pressure in said intake manifold;
means for detecting the occurrence of a predetermined rotational position of said engine;
means responsive to said rotational position detecting means for obtaining an interrupt signal in substantial synchronism with each occurrence of said predetermined rotation position of said engine, and for determining a rotational speed of said engine as a function of each occurrence of said predetermined rotational position of said engine;
computing means responsive to said interrupt signal for receiving, substantially synchronously with each occurrence of said predetermined rotational position of said engine, from said first pressure determining means an output indicative of the level of negative pressure in said intake manifold, and from said interrupt signal obtaining and rotational speed determining means an output indicative of the rotational speed of said engine, and for determining in accordance therewith a recirculation instruction signal;
means for determining a degree of opening of said valve means; and
means responsive to an output from said degree of opening determining means indicative of the degree of opening of said valve means, and to said recirculation instruction signal, for driving said valve means to optimize the amount of exhaust gas recirculated.

11. A system as in claim 10, wherein said rotational position detecting means generates an output signal each time a reference piston of said engine reaches approximately 120 degrees before top dead center.

12. A system as in claim 10, wherein said rotational position detecting means generates an output signal each time a crankshaft of said engine occupies a crankshaft rotational position of 240 degrees.

13. A system as in claim 10, wherein said interrupt signal obtaining and rotational speed determining means comprises:
a pulse generating circuit for deriving a timing pulse signal from an output of said rotational position detecting means indicative of the occurrence of said predetermined rotational position of said engine;
means for generating clock pulses;
means for controllably counting said clock pulses to determine the rotational speed of said engine as a function of the number of said clock pulses counted between adjacent timing pulse signals; and
means for counting said clock pulses to generate said interrupt signal.

14. A method of recirculating exhaust gas from an exhaust manifold of an internal combustion engine to an intake manifold thereof, utilising an exhaust gas recirculation valve, comprising the steps of:
detecting the occurrence of a predetermined rotational position of said engine;
determining a level of negative pressure in said intake manifold in substantial synchronism with the occurrence of said predetermined rotational position;
determining an engine rotational speed in accordance with the result of said rotational position occurrence detecting step;
receiving said engine rotational speed and information indicative of the result of said intake manifold pressure determining step;
computing a recirculation instruction signal from the result of said engine rotational speed and information step;
determining an opening ratio of a recirculation control valve;
controlling the opening ratio of said control valve in response to the determined opening ratio and said recirculation instruction signal to controllably recirculate exhaust gas from said exhaust manifold to said intake manifold, said control valve being connected therebetween.

* * * * *